US011872649B2

(12) United States Patent
Lakey et al.

(10) Patent No.: US 11,872,649 B2
(45) Date of Patent: Jan. 16, 2024

(54) OFFSHORE PIPELAYING SYSTEM USING FRICTION STIR WELDING

(71) Applicant: Frank's International, LLC, Houston, TX (US)

(72) Inventors: Nigel Lakey, Houston, TX (US); Brennan Domec, Sunset, LA (US); Jeremy R. Angelle, Youngsville, LA (US); Matthew Weber, Duson, LA (US)

(73) Assignee: FRANK'S INTERNATIONAL, LLC, Houston, TX (US)

( * ) Notice: Subject to any disclaimer, the term of this patent is extended or adjusted under 35 U.S.C. 154(b) by 0 days.

(21) Appl. No.: 17/712,348

(22) Filed: Apr. 4, 2022

(65) Prior Publication Data
US 2022/0324053 A1     Oct. 13, 2022

Related U.S. Application Data

(60) Provisional application No. 63/171,733, filed on Apr. 7, 2021.

(51) Int. Cl.
*B23K 20/00*     (2006.01)
*B23K 20/12*     (2006.01)
*B23K 101/10*     (2006.01)

(52) U.S. Cl.
CPC ...... *B23K 20/1245* (2013.01); *B23K 2101/10* (2018.08)

(58) Field of Classification Search
CPC .............. B23K 20/122; B23K 2101/06; B23K 37/0533; B23K 9/0953; B23K 9/0956; B23K 20/126; B23K 20/129; B23K 20/123; B23K 2101/10; B23K 2101/04
See application file for complete search history.

(56) References Cited

U.S. PATENT DOCUMENTS

| | | | |
|---|---|---|---|
| 9,821,407 B2 * | 11/2017 | Matsushita | .......... B23K 20/129 |
| 10,010,970 B2 * | 7/2018 | Toguyeni | ................ E21B 19/16 |
| 11,322,037 B2 * | 5/2022 | Becker | ...................... G09B 9/00 |
| 11,504,808 B2 * | 11/2022 | Pinarello | ................ E21B 19/00 |
| 2008/0302539 A1 | 12/2008 | Mallenahalli et al. | |
| 2009/0134203 A1 | 5/2009 | Domec et al. | |
| 2019/0009354 A1 * | 1/2019 | Atin | ................... B23K 37/0276 |
| 2020/0292102 A1 * | 9/2020 | Ducceschi | ........... B23K 33/006 |
| 2021/0033237 A1 * | 2/2021 | Tsuto | ..................... B23K 9/235 |

FOREIGN PATENT DOCUMENTS

EP     0271184 A1     6/1988

OTHER PUBLICATIONS

Extended European Search Report dated Aug. 16, 2022, EP Application No. 22166844, 8 pages.

\* cited by examiner

*Primary Examiner* — Erin B Saad
(74) *Attorney, Agent, or Firm* — MH2 TECHNOLOGY LAW GROUP, LLP

(57) ABSTRACT

A system for laying pipe includes a conveyor configured to receive one or more pipes, and one or more friction stir welding (FSW) machines configured to connect the one or more pipes to a pipeline deployed toward a sea floor.

19 Claims, 6 Drawing Sheets

OFFSHORE PIPELAYING SYSTEM USING FRICTION STIR WELDING

CROSS-REFERENCE TO RELATED APPLICATIONS

This application claims priority to U.S. Provisional Patent Application having Ser. No. 63/171,733, which is incorporated herein by reference in its entirety.

BACKGROUND

Offshore pipelines are typically deployed or "laid" using either S-lay or J-lay vessels and techniques. The names for these vessels/techniques are given based on the shape that the deployed pipeline makes as it extends from the vessel toward the seafloor. In an S-lay operation, the pipeline is generally horizontal on the vessel deck, where additional lengths of pipe are attached to the pipeline, to extend the pipeline. The pipeline curves from horizontal to near vertical, and then back to horizontal at the seafloor. In J-lay operation, the pipeline is generally deployed in a vertical or near vertical orientation from the vessel toward the seafloor, where it curves toward horizontal. The vessel generally moves as the pipe is deployed, thereby laying the pipeline along the sea floor.

In both such operations, additional lengths of pipe are connected to the end of the pipeline, typically by arc welding. The process generally proceeds by one or more lengths of pipe being received into a conveyor, often referred to as a firing line, where it is welded to the end of the pipeline that is currently being deployed. In the S-lay configuration, the new or "add-on" pipe is welded in a generally horizontal orientation to the pipeline, and in a J-lay configuration, several add-on pipe segments may be welded together into an assembly and then the assembly is brought to (or near to) a vertical orientation and then welded onto the end of the pipeline.

Arc welding is successfully employed in the field to join the lengths of pipe to form the pipelines. However, the pipelaying vessel is usually stopped while connections of add-on pipes are made. Once the welded connection is complete, the vessel then moves by the distance of the added pipe(s), and then one or more additional pipes are loaded and connected, and the process repeats. This stop-and-start, incremental progression is time-consuming and calls for vessel operators to constantly start and stop the vessel propulsion system. Moreover, there are other challenges presented to arc welding the pipes together. For example, some metals are difficult to weld, and may be considered un-weldable for practical purposes. Corrosion resistant pipes are sometimes made of such metals. Further, arc welding heats the pipes, or at least portions thereof, to high temperatures, which can affect the metallurgical properties of the pipes and, further, the pipes may need to be cooled before inspection of the welds, further slowing the pipelaying process.

SUMMARY

A system for laying pipe includes a conveyor configured to receive one or more pipes, and one or more friction stir welding (FSW) machines configured to connect the one or more pipes to a pipeline deployed toward a sea floor.

A method includes positioning one or more pipes on a conveyor on a vessel, and connecting the one or more pipes to a pipeline extending from the vessel toward a sea floor, using one or more friction stir welding (FSW) machines.

The foregoing summary is intended merely to introduce a subset of the features more fully described of the following detailed description. Accordingly, this summary should not be considered limiting.

BRIEF DESCRIPTION OF THE DRAWINGS

The accompanying drawing, which is incorporated in and constitutes a part of this specification, illustrates an embodiment of the present teachings and together with the description, serves to explain the principles of the present teachings. In the figures.

Figure 1:
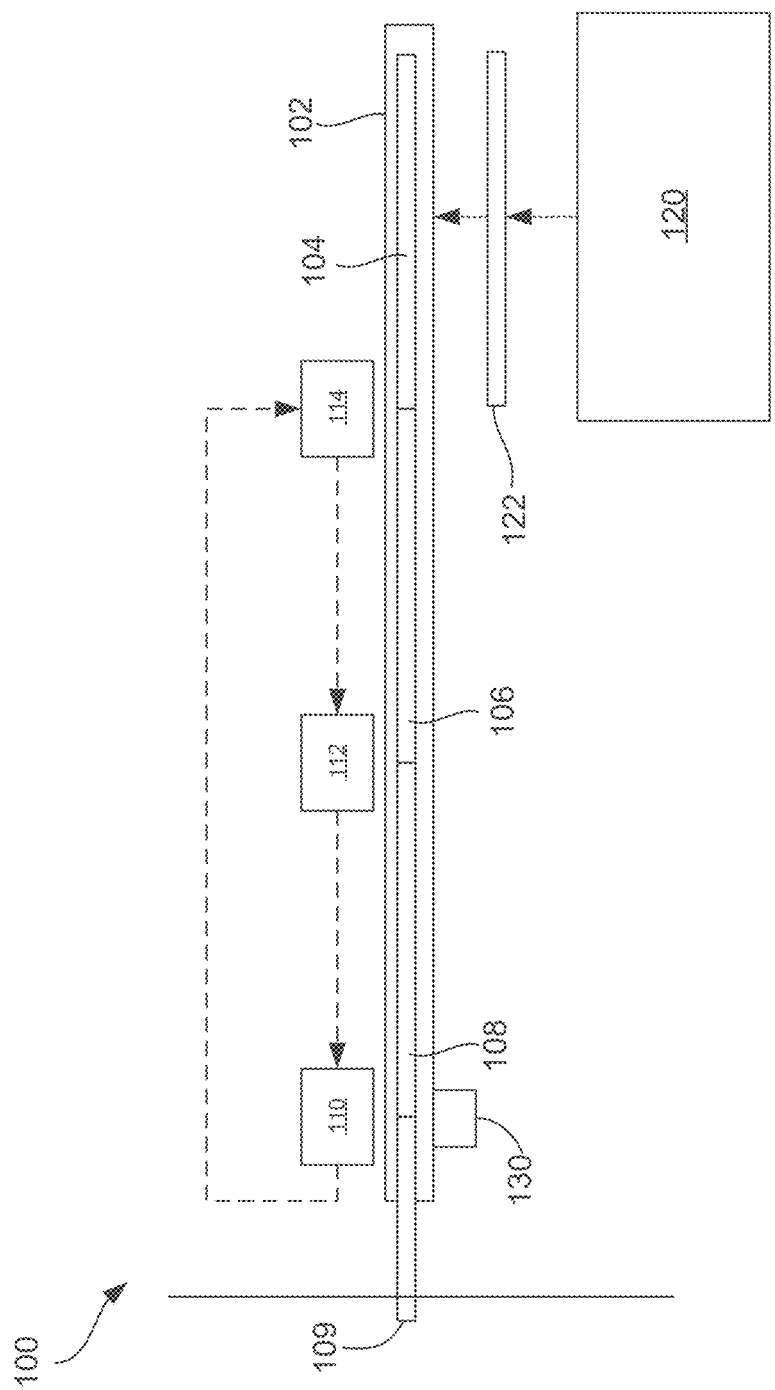
FIG. 1 illustrates a schematic view of a pipeline assembly system, according to an embodiment.

It should be noted that some details of the figure have been simplified and are drawn to facilitate understanding of the embodiments rather than to maintain strict structural accuracy, detail, and scale.

DETAILED DESCRIPTION

Reference will now be made in detail to embodiments of the present teachings, examples of which are illustrated in the accompanying drawing. In the drawings, like reference numerals have been used throughout to designate identical elements, where convenient. The following description is merely a representative example of such teachings.

FIG. 1 illustrates a schematic view of a pipeline assembly system 100, according to an embodiment. The pipeline assembly system 100 may be at least partially provided on the deck of a marine vessel (e.g., a ship) that may be underway or docked. The vessel may be configured to lay pipe either in an S-lay or J-lay operation, as will be described in greater detail below.

The system 100 may generally include a conveyor 102, which may be a relatively long and narrow structure configured to receive and permit pipes 104, 106, and 108 to smoothly slide along. It will be appreciated that conveyors of various types and other mechanisms to move the pipe may be employed for the conveyor 102, and, moreover, that the conveyor 102 may be configured to receive any number of pipes, with the three pipes 104-108 shown being merely an example. The conveyor 102 may be generally horizontally disposed or generally vertically disposed on the deck of the vessel. A generally horizontal disposition may be employed for S-lay operations, and generally vertical disposition (e.g., on a vertical ramp structure) may be employed for J-lay operations. It will be appreciated that either such generally horizontal or generally vertical configurations are within the scope of the present disclosure.

The pipes 104-108 may be configured to be coupled together, end-to-end, and to a previously-deployed pipeline 109 that may extend from the vessel down toward the seafloor. In some embodiments, the pipes 104-108 shown may actually each be two or more pipe segments that were previously joined together, e.g., as "doubles" or "triples" of two or three pipes, respectively. The pre-connecting of two or more pipes, e.g., on-shore or while the vessel is travelling to a pipelaying position, may reduce the number of connections to be made during pipelaying operations.

The system 100 may also include one or more friction stir welding (FSW) machines. In this example, there are three shown, as indicated by reference numbers 110, 112, 114. It will be appreciated that any number of FSW machines may be employed, however. The FSW machines 110-114 may each include a tool that has a cylindrical body with a shoulder and protruding pin. The tool is rotated at high velocity and plunged into the interface between the two pipes until the shoulder and pipe material come into contact. The tool dwells in place and generates frictional heating that, when combined with the rotation of the tool, plasticizes the material. Once sufficient plasticization is achieved, the tool traverses a prescribed path (e.g., the circumferential interface between the two adjacent pipes) to complete the joint. Material generally flows around the tool pin and up to the shoulder ("Maelstrom flow") where downward force effectively forges the material. In the last phase, the tool exits the interface, and the joint is considered complete. Moreover, the FSW machines 110-114 may be orbital, and thus may automatically produce an annular weld around the exterior of the pipe end connections. The FSW machines 110-114 may include one, two, or more welding tools (also referred to as "probes" or "heads"), which may operate in unison thereby decreasing the travel distance for each of the tools and potentially reducing the time needed to form a connection. In at least some embodiments, the FSW machines 110-114 may operate independently, or at least be able to operate independently, as will be discussed in greater detail below.

As shown in FIG. 1, in addition to orbiting the pipes 104-108, the FSW machines 110-114 may move in a direction along the axis of the conveyor 102 and the pipes 104-108, with respect to the vessel (e.g., generally vertically or horizontally, depending on the type of pipelaying operation/vessel). Further, the FSW machines 110-114 may move along a circuit (e.g., along a track), which runs along the axis of the conveyor 102 until reaching some end point near to where the pipeline 109 is deployed from the vessel into the body of water. The end point may be common to all of the FSW machines 110-114. At that point, the track (whether structural or virtual) may route the individual FSW machines 110-114 back to a common starting point that is offset from the end point along the conveyor 102, e.g., where FSW machine 114 is shown in FIG. 1. Accordingly, the FSW machines 110-114 may each traverse the same circuit/track.

The system 100 may further include a pipe hopper 120. The hopper 120 may be a rack configured to store multiple pipes 122, which may be loaded onto the conveyor 102. In some embodiments, the hopper 120 may be positioned on the marine vessel or on a separate "auxiliary" vessel that is temporarily held alongside the marine vessel.

The system 100 may also include an inspection tool 130. The inspection tool 130 may be positioned at an end of the conveyor 102, proximal to where the pipeline 109 extends from the vessel. In other embodiments, multiple inspection tools 130 may be provided, e.g., at intervals along the length of the conveyor 102. In still other embodiments, the inspection tool 130 may be integrated into the FSW machines 110-114, e.g., mounted to the FSW head, mounted to a separate appendage, and/or mounted on a separate head capable of traversing the completed joint.

The inspection tool 130 may perform non-destructive examination (NDE) of the connections formed by the FSW machines 110-114. For example, the inspection tool 130 may include ultrasonic transducers, magnetic coils, etc. NDE stations may also be integrated within the fabrication process owing to the lower joining temperatures afforded by FSW. Because of these lower temperatures, the completed connections (and/or other sections of the pipes 104-108) may be inspected almost immediately upon completion as opposed to conventional fabrication processes which require substantial cooling time to lapse before inspection can occur.

In at least some embodiments, the system 100 may include one or more devices for detecting a position of the end of a given pipe, e.g., pipe 106. For example, an optical sensor, an electronic sensor, a mechanical gauge, or the like could be used to provide input as to a location of the end of a given pipe 106 on the conveyor 102. Detecting the end of the pipe 106 may facilitate rapidly positioning and aligning the pipe 106 relative to an adjacent pipe (e.g., pipe 108, 104, or both), and to locating the FSW machines 110-114 to provide a starting location to begin welding.

Figure 2:
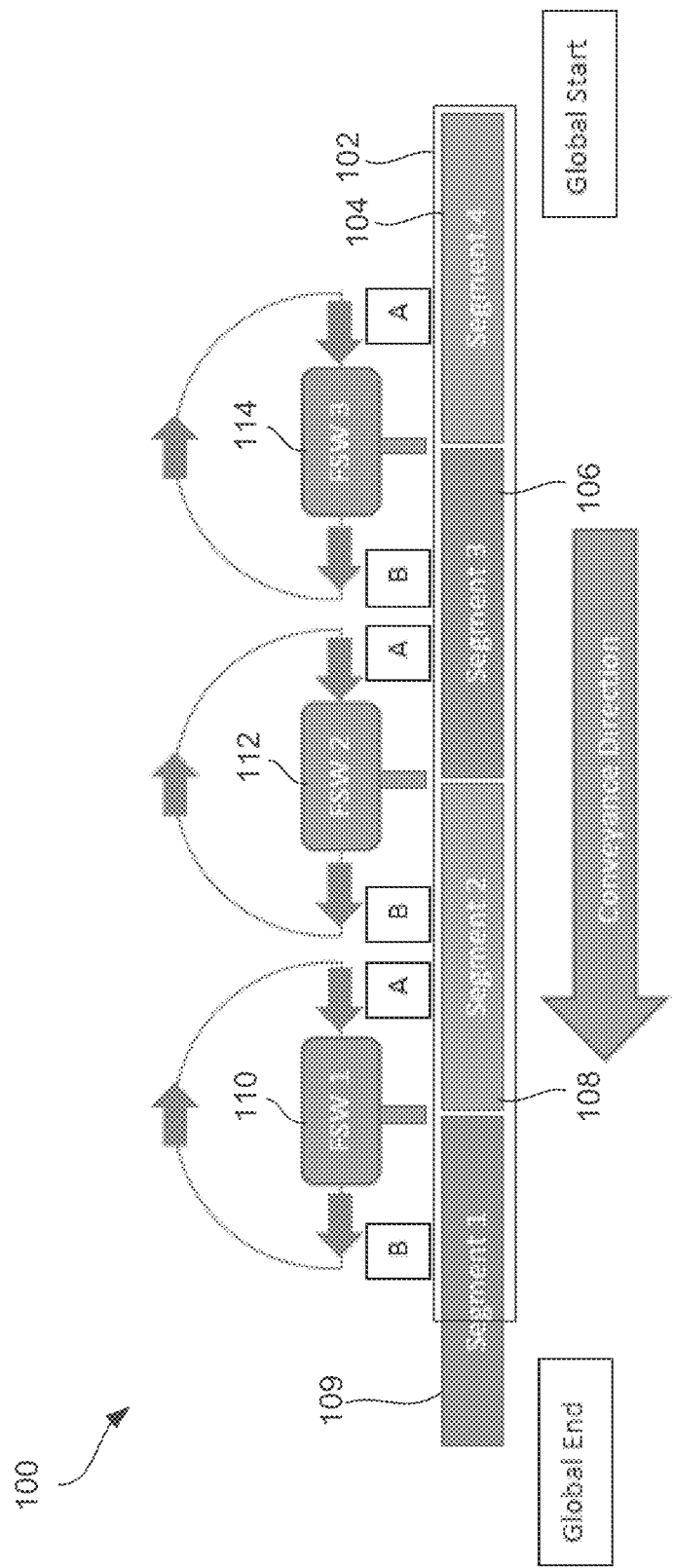
FIG. 2 illustrates a schematic view of another embodiment of the pipeline assembly system.

FIG. 2 illustrates a schematic view of another embodiment of the system 100. In this embodiment, the travel distance of the FSW machines 110-114 may be reduced as compared to the travel distance of the FSW machines 110-114 in FIG. 1. In particular, the FSW machines 110-114 may each move between respective starting positions A and ending positions B, with the ending position of one FSW machine (e.g., FSW machine 112) being adjacent and closely proximal to the starting position A of the next FSW machine (e.g., FSW machine 110). The FSW machines 110-114 may thus form the connections between adjacent pipes 104-108 and the pipeline 109 as the FSW machines 110-114 travel between their respective starting and ending points A, B. Upon reaching the end points B, which may occur simultaneously for the FSW machines 110-114, the FSW machines 110-114 may travel back to their respective starting points A, so as to begin preparing more connections. In at least some embodiments, the position of the connection being made, between points A and B for the respective paths of the FSW machines 110, 112, 114 parallel to the pipeline 109 may be variable, e.g., independently. Accordingly, the FSW machines 110, 112, 114 may be configured in some embodiments to move along with the pipeline 109 as it is deployed (as will be discussed below), and also to accommodate pipe joints of differing lengths.

Figure 3:
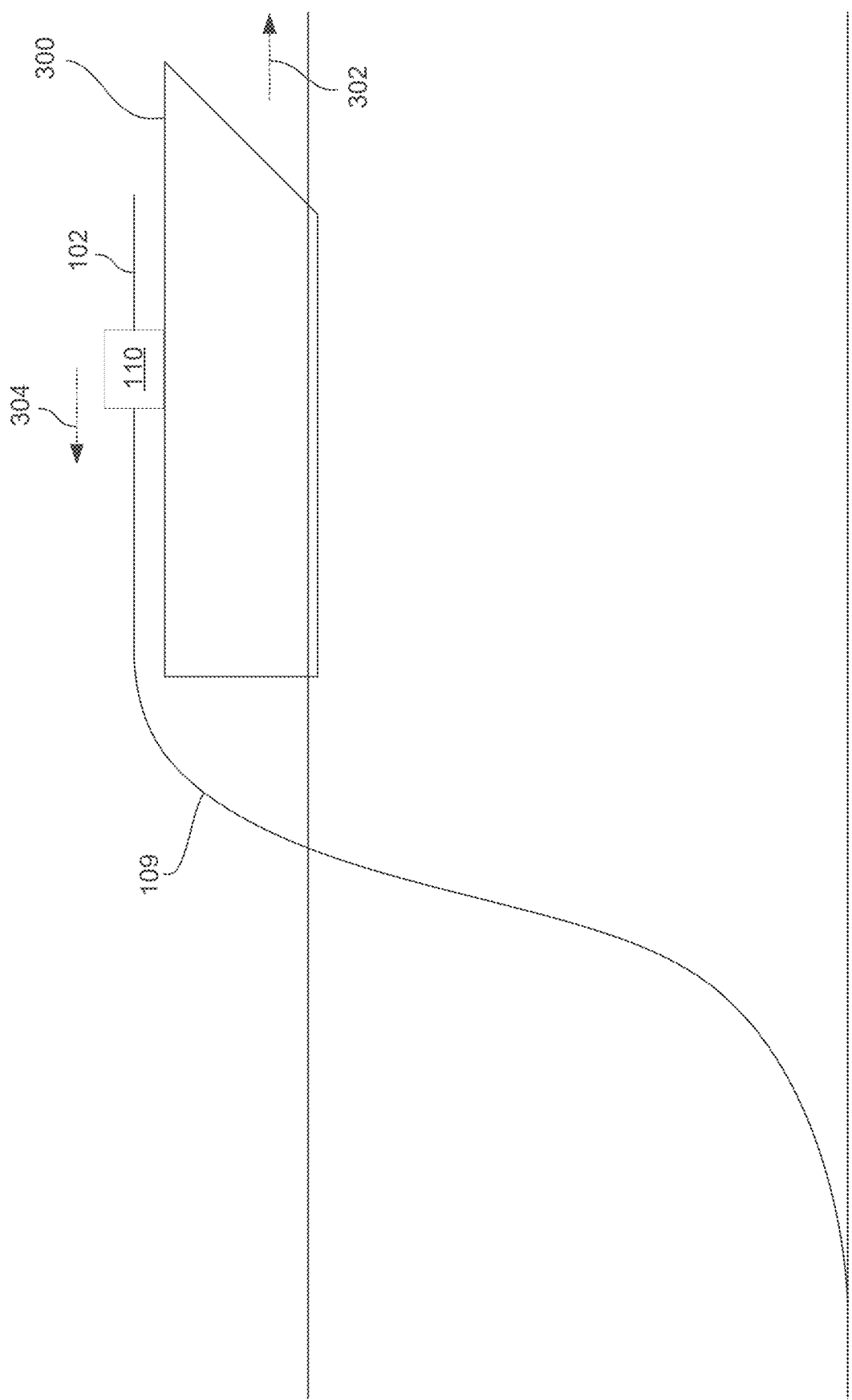
FIG. 3 illustrates a schematic view of a S-lay pipelaying vessel, according to an embodiment.

FIG. 3 illustrates a side, schematic view of a vessel 300 deploying the pipeline 109 in an S-lay configuration, according to an embodiment. The vessel 300 may include at least a portion of either or both of the embodiments of the system 100 discussed above. The vessel 300 may include a propulsion system, which may be configured to move the vessel 300 along the surface of the body of water, e.g., in the direction 302. As the vessel 300 moves, the pipeline 109 is played out from the vessel 300.

In some embodiments, the system 100 may permit the vessel 300 to move while the connections are being made. That is, the FSW machines 110-114 (FSW machine 110 is shown for illustrative purposes in FIG. 3), may move relative to the vessel in an equal (or substantially equal) speed and in an opposite direction to the vessel 300 (e.g., as discussed above with respect to either FIG. 1 or FIG. 2). Accordingly, the FSW machines 110-114, while forming the connections, may maintain the same position with respect to the pipeline 109 (e.g., aligned with a connection between two pipes 104-108), while the vessel 300 moves. Stated otherwise, in this generally horizontal-movement (S-lay)

embodiment, the FSW machines 110-114 may remain in a constant position when viewed from a stationary reference point (e.g., viewed from a reference point on the seafloor). In at least some embodiments, a controller may be provided to coordinate the speed at which the FSW machines 110-114 move and the speed at which the vessel 300 moves. For example, the controller may adjust the speed of either in order to match, or substantially match the speeds thereof, such that the FSW machines 110-114 move at substantially the same speed as the vessel 300. In other embodiments, however, the FSW machines 110-114 may be a direct swap for conventional arc welding machines, and may thus be stationary with respect to the vessel 300. In this embodiment vessel movement is incremental and each incremental move occurs after each weld is completed.

Figure 4A:
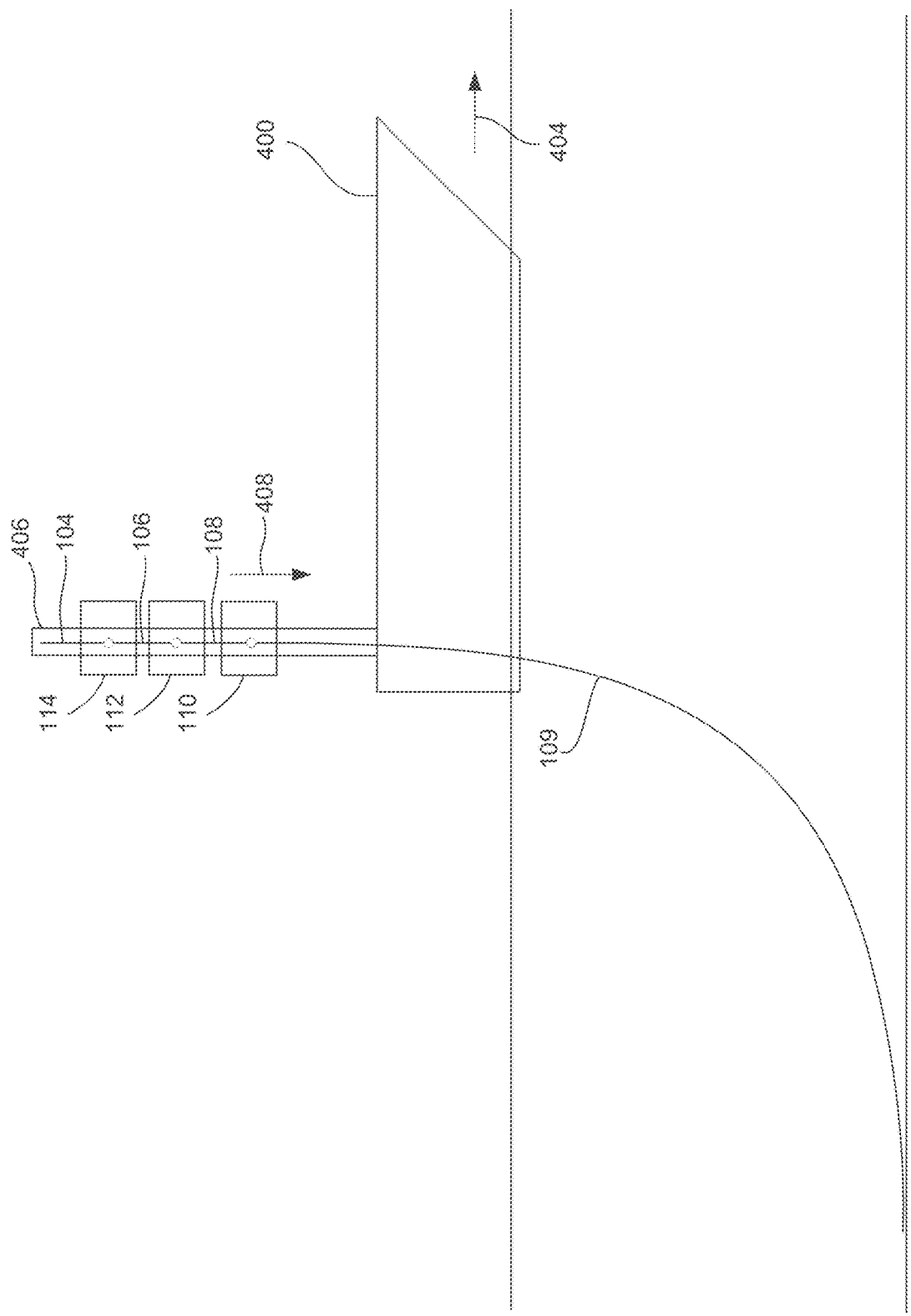
FIG. 4A illustrates a schematic view of a J-lay pipelaying vessel, according to an embodiment.

FIG. 4A illustrates a side, schematic view of a vessel 400 deploying the pipeline 109 in a J-lay configuration, according to an embodiment. The vessel 400 may also include at least a portion of either or both of the embodiments of the system 100 discussed above, and may include a propulsion system configured to move the vessel 400 in a direction 404 along the surface of the body of water. The vessel 400 may also include a vertically-extending conveyor 406 on which the FSW machines 110-114 may move, e.g., in direction 408. In an embodiment, the FSW machines 110-114 may move in the direction 408, while the FSW machines 110-114 are welding, at the same rate as the vessel 400 moves in the direction 404, thereby maintaining position at the connection between two pipes. Accordingly, the system 100 may permit continuous movement of the vessel 400 while laying pipe. In at least some embodiments, a controller may be provided to coordinate the speed at which the FSW machines 110-114 move and the speed at which the vessel 400 moves, as described above, so that the FSW machines 110-114 move at substantially the same speed as the vessel 400. In at least one embodiment, the vessel may also be configured to alter its speed (e.g., relatively small adjustments) to account for variations in conveying pipe. Further, the controller may be provided with vessel speed as an input, and may adjust one or more parameters of the FSW machines 110-114 welding processes to increase welding speed or decreasing welding speed, depending on the speed of the vessel.

Figure 4B:
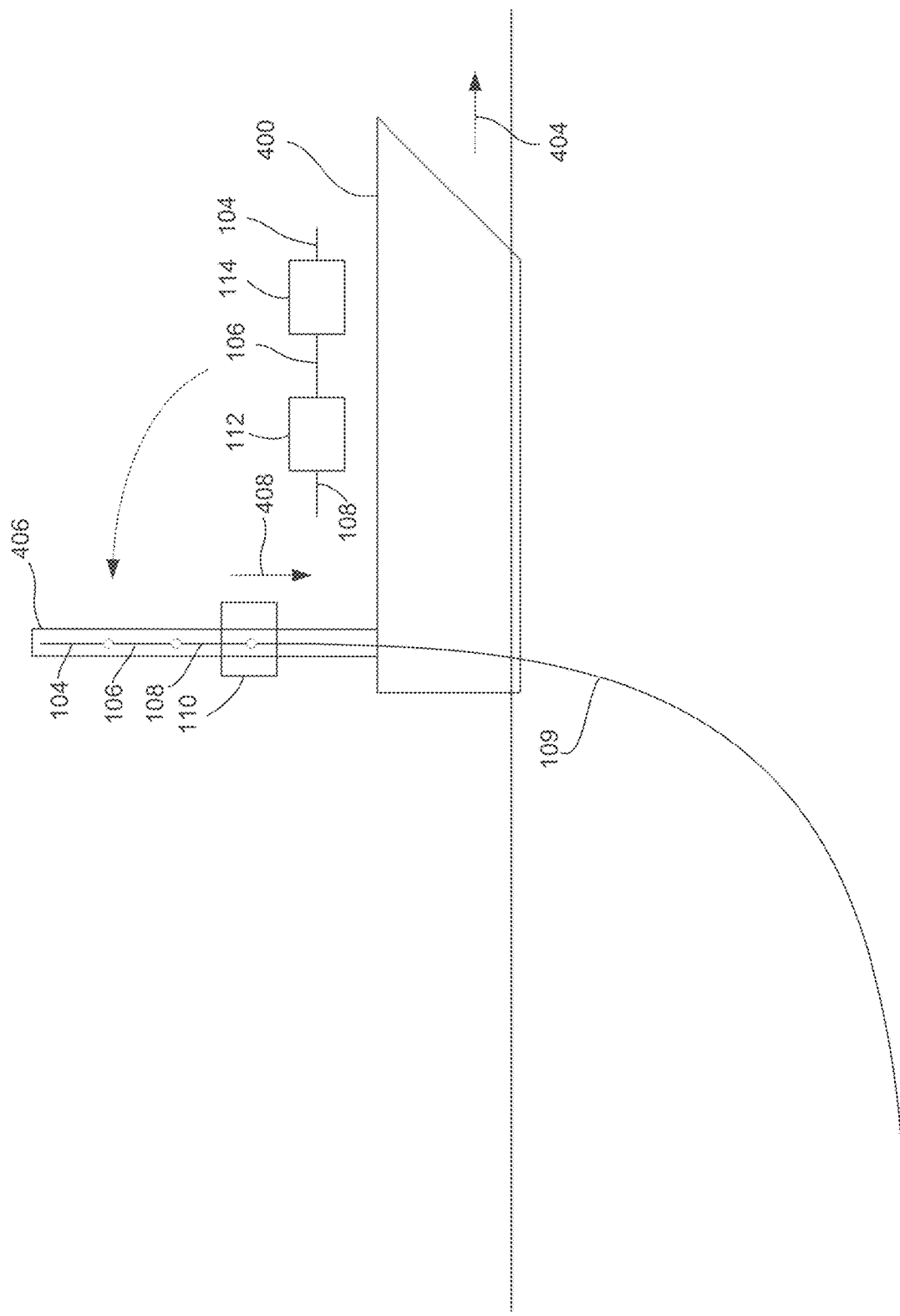
FIG. 4B illustrates a schematic view of another embodiment of a J-lay pipelaying vessel.

FIG. 4B illustrates a side, schematic view of a vessel 400 deploying the pipeline 109 in a J-lay configuration, according to an embodiment. The vessel 400 may also include at least a portion of either or both of the embodiments of the system 100 discussed above for preassembling individual segments of pipe in a generally horizontal orientation into an assembly where the assembly is then transferred into the vertically extending conveyor where the assembly is joined to the pipeline 109 at FSW machine 110. The vessel may include a propulsion system configured to move the vessel 400 in a direction 404 along the surface of the body of water. In an embodiment, the FSW machine 110 may move in the direction 408 at the same rate as the vessel 400 moves in the direction 404, thereby maintaining position at the connection between two pipes. Accordingly, the system 100 may permit continuous movement of the vessel 400 while laying pipe. In at least some embodiments, a controller may be provided to coordinate the speed at which the FSW machine 110 moves and the speed at which the vessel 400 moves, as described above, so that the FSW machine 110 moves at substantially the same speed as the vessel 400. In other embodiments, however, the FSW machines 110-114 may thus be stationary with respect to the vessel 400. In this embodiment vessel movement is incremental and each incremental move occurs after each weld is completed.

Figure 5:
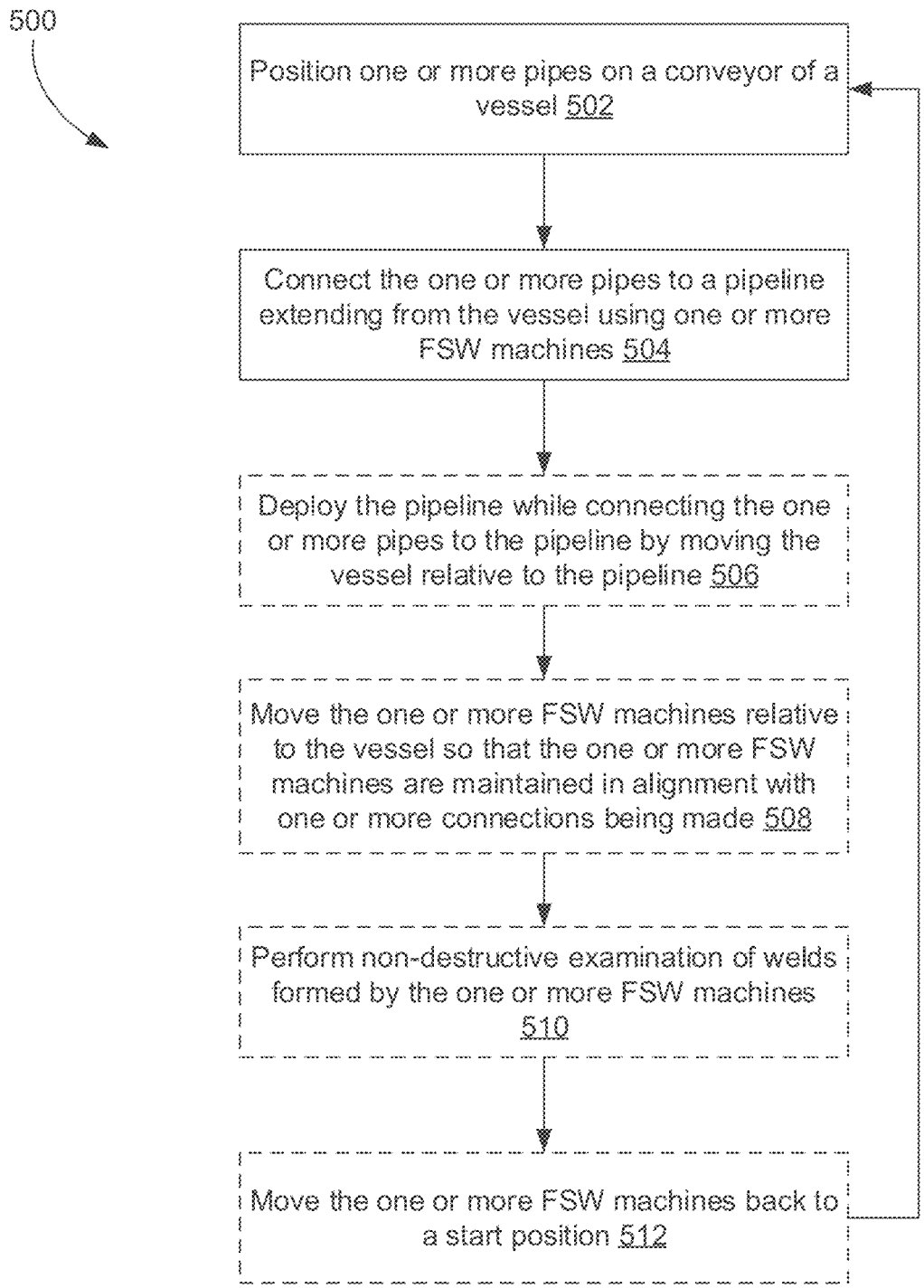
FIG. 5 illustrates a flowchart of a method for pipelaying, according to an embodiment.

FIG. 5 illustrates a flowchart of a method 500 for pipe-laying, according to an embodiment. The method 500 may be executed using one or more embodiments of the system 100 discussed above, but at least some embodiments of the method 500 may employ other systems, and thus the method 500 should not be considered limited to any particular structure, unless otherwise stated herein. Moreover, the steps of the method 500 may be performed in the order presented below, or in any other order. Some steps of the method 500 may be combined, partitioned into two or more steps, performed in parallel, or the like, without departing from the scope of the present disclosure.

The method 500 may include positioning one or more pipes (or "pipe segments") 104-108 on a conveyor 102 of a vessel (e.g., vessel 300 or 400), as at 502. In at least some embodiments, this may include determining a location of individual ends of the pipes 104-108, e.g., to facilitate a determination of the location where two pipes will be joined together on the conveyor 102.

The method 500 may then include connecting the one or more pipe segments together and/or to an end of a pipeline 109, as at 504. The connecting may be accomplished using a friction stir welding (FSW) machine, e.g., FSW machines 110-114. The FSW machines 110-114 may, for example, at least partially surround the pipes 104-108 and orbitally form a connection (FSW weld) between the pipes 104-108 and/or between the pipe 108 and the pipeline 109. The FSW machines 110-114 may be brought into proximity with the location where the ends of adjacent pipes 104-108 meet, and may, e.g., simultaneously and at a rate potentially determined at least partially by the speed of the vessel, may generate a connection between the pipes using friction stir welding, for example.

In some embodiments, the method 500 may also include deploying the pipeline 109 while connecting the one or more pipes 104-108 together and/or to the pipeline 109, as at 506. This may be accomplished by moving the vessel 300 or 400 relative to the pipeline 109. Further, during such deployment, the one or more FSW machines 110-114 may be moved relative to the vessel 300 or 400 so that the FSW machine 110-114 maintains its position at the connection it is making, as at 508. In an S-lay embodiment, the FSW machines 110-114 may thus move generally horizontally in a direction opposite to the movement of the vessel 300, and in a J-lay embodiment, the FSW machines 110-114 may move vertically toward the deck of the vessel 400 at the same speed as vessel 400 moves in a generally horizontal direction. As such, the FSW machines 110-114 may remain in a constant position relative to the pipes 104-108 that they are connecting together and/or to the pipeline 109, permitting the machines 110-114 to finish the connection despite the movement of the vessel playing out the pipes/pipeline. Moreover, the method 500 may include coordinating the speeds of the FSW machines 110-114 and the vessel 300/400 in order to move the FSW machines 110-114 and the vessel 300, 400.

In some embodiments the FSW machines 110-114 may move along the conveyor 102. For example, the machines 110-114 may traverse a circuit that includes at least a majority of the conveyor 102 length, with each of the FSW machines 110-114 returning to the same, common starting point to begin connecting a connection for a new pipe, as described above with reference to FIG. 1. In another example, the FSW machines 110-114 may form a firing line, such that, e.g., three, new pipes 104-108 may be received into the conveyor 102, and the FSW machines 110-114 may each commence welding at generally the same time. The FSW machines 110-114 may move during this welding time, between "local" starting and ending points, as described above with respect to FIG. 2. As noted above, in some embodiments, the FSW machines 110-114 may not move. Moreover, the local starting point may be adjustable, e.g., depending on a relative location of an end of the pipes 104-108, which may be detected using any suitable device (e.g., optically, using a mechanical gauge, etc.). The FSW machines 110-114 may thus be configured to move independently of one another, and relative to one another, in order to find a specific, local starting point where the ends of adjacent pipes 104-108 meet. Further, the FSW machines 110-114 may move along the conveyor 102 and may perform the welding process at a speed that at least partially depends on the speed of the vessel 400. The speed of the vessel 400 may also be manipulated to accommodate the speed constraints of the FSW machines 110-114 (both in terms of their ability to move along the conveyor 102 and to perform the welding process).

In some embodiments, the method 500 may further include performing non-destructive examination (NDE) of the welds formed by the FSW machines 110-114, as at 510. For example, inspection tools 130, such as radiography, ultrasonic transducers, magnetic coils, etc. may be employed to inspect one or more (e.g., each) weld formed by the individual FSW machines 110-114 and/or any other section of the pipes 104-108 before, during, or after the connection process. The method 500 may then include returning the FSW machines 110-114 to a starting point (e.g., local or common, depending on the embodiment), as at 512, so that the method 500 may begin again.

In at least some embodiments, the method 500 may also include preheating the pipes 104-108, e.g., immediately ahead of the individual FSW machines 110-114. This may reduce wear on the tools of the FSW machines 110-114 and increase joining speed. Preheating may be applied by, for example, induction, flame, or mechanical heating. In at least some embodiments, the pipes 104-108 may be predrilled with a plunge hole at a joint weld start location, which may reduce joining time and wear on the tool.

In one or more embodiments, the systems 100 and/or method 500 may be applied in the context of thin-walled tubulars that are reeled onto a spool, e.g., on-shore or using mobile units on a vessel, loaded onto a marine vessel, and deployed to form a pipeline while the vessel is underway. The mechanical and metallurgical properties of FSW-connections may enable reeling of larger diameter tubulars with larger wall thicknesses than is currently feasible with arc welding techniques. For example, FSW machines (e.g., welders) may join segments at a shore base, which are then reeled. Because of its superior mechanical/metallurgical properties, the weld would no longer be the weak point. The ability to reel would then be determined by the mechanical capabilities of the base metal and associated geometry effects, rather than the strength of the weld, in at least some embodiments. Reels would then be loaded onto a barge or pipelaying vessel for deployment.

As used herein, the terms "inner" and "outer"; "up" and "down"; "upper" and "lower"; "upward" and "downward"; "above" and "below"; "inward" and "outward"; "uphole" and "downhole"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

While the present teachings have been illustrated with respect to one or more implementations, alterations and/or modifications may be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A system for laying pipe, comprising:
   a conveyor configured to receive one or more pipes;
   one or more friction stir welding (FSW) machines configured to connect the one or more pipes to a pipeline deployed toward a sea floor; and
   a marine vessel on which the conveyor and the one or more FSW machines are positioned, wherein the marine vessel comprises a propulsion system configured to move the marine vessel in a direction, and wherein the one or more FSW machines are configured to move in the direction along an axis of the conveyor at substantially a same speed as the propulsion system moves the marine vessel.

2. The system of claim 1, wherein the conveyor is generally horizontally disposed or vertically disposed.

3. The system of claim 1, further comprising one or more inspection devices configured to perform non-destructive examination of at least a portion of the one or more pipes.

4. The system of claim 3, wherein the one or more inspection devices are integrated into the one or more FSW machines.

5. The system of claim 1, wherein the one or more FSW machines are configured to move in the direction along the axis of the conveyor while forming a connection.

6. The system of claim 1, wherein the marine vessel moves in the direction while the one or more FSW machines are forming a connection.

7. The system of claim 1, wherein the one or more FSW machines comprise a plurality of FSW machines, and wherein the one or more pipes comprise a plurality of pipes, wherein at least one of the plurality of FSW machines is configured to connect together two of the plurality of pipes, and wherein at least one of the FSW machines is configured to connect one of the plurality of pipes to the pipeline.

8. The system of claim 7, wherein the FSW machines are configured to move between a start point and an end point, and wherein the start point of one of the FSW machines is adjacent to the end point of another one of the FSW machines.

9. The system of claim 7, wherein the FSW machines are all configured to move between a common starting point and a common end point along a circuit.

10. A method for laying pipe, the method comprising:
positioning one or more pipes on a conveyor on a vessel;
connecting the one or more pipes to a pipeline extending from the vessel toward a sea floor, using one or more friction stir welding (FSW) machines; and
moving a marine vessel in a direction using a propulsion system, wherein the conveyor and the one or more FSW machines are positioned on the marine vessel, and wherein the one or more FSW machines are configured to move in the direction along an axis of the conveyor at substantially a same speed as the propulsion system moves the marine vessel.

11. The method of claim 10, further comprising deploying the pipeline while connecting the one or more pipes to the pipeline by moving the vessel relative to the pipeline.

12. The method of claim 11, further comprising moving the one or more FSW machines relative to the vessel so that the one or more FSW machines are maintained in alignment with one or more connections that the one or more FSW machines are forming.

13. The method of claim 12, further comprising coordinating the speed of the vessel and the speed of the one or more FSW machines.

14. The method of claim 10, further comprising performing non-destructive examination of welds formed by the one or more FSW machines.

15. The method of claim 10, wherein the one or more FSW machines comprise a plurality of FSW machines, wherein the one or more pipes comprise a plurality of pipes, and wherein the one or more FSW machines each move between a respective starting point and a respective ending point relative to the conveyor, the starting point of one of the FSW machines being adjacent to the ending point of another one of the FSW machines.

16. The method of claim 10, wherein the one or more FSW machines comprise a plurality of FSW machines, wherein the one or more pipes comprise a plurality of pipes, and wherein the one or more FSW machines each move between a common starting point and a common ending point relative to the conveyor, such that the plurality of FSW machines traverse a same path with respect to the conveyor.

17. The method of claim 16, further comprising adjusting a position of at least one of the plurality of FSW machines based on a location of an end of one of the plurality of pipes on the conveyor, relative to and independently of movement of another of the FSW machines.

18. The method of claim 10, further comprising reeling the one or more pipes onto a spool prior to connecting the pipes to the pipeline.

19. The method of claim 10, wherein the one or more pipes each comprise one or more segments connected together prior to being positioned on the conveyor.

* * * * *